US011126629B2

(12) United States Patent
Mpossi et al.

(10) Patent No.: US 11,126,629 B2
(45) Date of Patent: Sep. 21, 2021

(54) SYSTEM AND METHOD FOR MINING PLAYLIST DATA FOR USE IN PROVIDING DIGITAL MEDIA OR OTHER CONTENT

(71) Applicant: SPOTIFY AB, Stockholm (SE)

(72) Inventors: Margreth Mpossi, Stamford, CT (US); Michael Rabadi, New York, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/667,209

(22) Filed: Aug. 2, 2017

(65) Prior Publication Data
US 2019/0042576 A1    Feb. 7, 2019

(51) Int. Cl.
*G06F 16/24* (2019.01)
*G06Q 30/02* (2012.01)
*G06F 16/40* (2019.01)
*G06F 16/95* (2019.01)
*G06F 16/2457* (2019.01)
*G06F 16/951* (2019.01)

(52) U.S. Cl.
CPC ........ *G06F 16/24578* (2019.01); *G06F 16/40* (2019.01); *G06F 16/951* (2019.01); *G06Q 30/02* (2013.01)

(58) Field of Classification Search
CPC .......... H04L 67/18; H04L 67/22; G06F 3/011; G06F 16/24578
USPC ........... 705/14.61, 14.68, 14.4; 707/713, 722
See application file for complete search history.

(56) References Cited

U.S. PATENT DOCUMENTS

| 8,117,185 B2* | 2/2012 | Franks | G06F 17/30017 707/713 |
| 8,260,656 B1* | 9/2012 | Harbick | G06F 16/24578 705/7.31 |
| 9,053,419 B2* | 6/2015 | Ling | G06Q 50/00 |
| 10,754,890 B2* | 8/2020 | O'Konski | G06F 3/011 |

(Continued)

OTHER PUBLICATIONS

Wikipedia, "Google Ads", retrieved from https://en.wikipedia.org/wiki/Google_Ads on May 12, 2021, 11 pages.

*Primary Examiner* — Saba Dagnew
(74) *Attorney, Agent, or Firm* — Tucker Ellis LLP

(57) ABSTRACT

In accordance with an embodiment, described herein is a system and method for mining playlist data, for use in providing advertisement-supported media content or targeted advertisements. A media server provides media content items as one or more media streams. Each of a plurality of playlists is associated with theme words provided by a title and/or description of the playlist. A playlist can also be associated with one or more theme words associated with the at least one media content item included in the playlist based on inclusion of the at least one media content item in the playlist. A dataset of media content item-theme word pairs provides an association of a particular media content item included in a particular playlist, with a theme word associated with that playlist. A score is assigned to each of the media content item-theme word pairs based on their appearances across several playlists. Advertisement-supported media content or targeted advertisements can be selected based on the dataset of media content item-theme word pairs, and, for example, fetched from an advertisement server, for insertion into a media stream.

20 Claims, 7 Drawing Sheets

(56) References Cited

U.S. PATENT DOCUMENTS

| | | | | |
|---|---|---|---|---|
| 2009/0265230 A1* | 10/2009 | Plachouras | ............ | G06Q 30/02 |
| | | | | 705/14.54 |
| 2010/0023402 A1* | 1/2010 | Wolinsky | ........... | G06Q 30/0264 |
| | | | | 705/14.61 |
| 2010/0162324 A1* | 6/2010 | Mehta | ................ | H04N 7/17318 |
| | | | | 725/61 |
| 2011/0208580 A1* | 8/2011 | Wolinsky | ............... | G06Q 30/02 |
| | | | | 705/14.48 |
| 2012/0253899 A1* | 10/2012 | Qin | .................... | G06Q 30/0241 |
| | | | | 705/14.4 |
| 2013/0018897 A1* | 1/2013 | Martinez | ................. | H04L 67/18 |
| | | | | 707/748 |
| 2013/0290307 A1* | 10/2013 | Boetje | ............... | G06F 17/30026 |
| | | | | 707/722 |
| 2015/0317680 A1* | 11/2015 | Richman | ............ | G06Q 30/0277 |
| | | | | 705/14.55 |
| 2016/0065637 A1* | 3/2016 | O'Malley | ............... | H04L 67/22 |
| | | | | 709/231 |

\* cited by examiner

| | |
|---|---|
| User 1 | "chinese","kpop","korean","2016","taiwan","bangtan","archive" |
| User 2 | "italiana","preferiti","aggiunto","miei","brani","italia","italiani","2016", indie ,"italiane","jazz" |
| User 3 | "coffeehouse","acoustic","coffee","chill","coffeehouse","discover","unwind","weekly","piano" |
| User 4 | "linmanuel","hamilton","discover","archive","weekly","broadway","musicals","edm","radar" |
| User 5 * | "discover","archive","weekly","2016","chiptunes","chiptune","8bit","folk","convention","fairport" |
| User 6 * | "punk","2016","brains","fantano","discover","exhibition","weekly","lit","albums","azkena","archive" |
| User 7 | "zim","dancehall","african","afro","south","house","zimbabwe","africa" |
| User 8 | "peaceful","piano","peacefull","concentration","klavier","focus","novel","konzentration" |
| User 9 | "funny","weird","yankovic","parody","wierd","nerdcore","geek","demento","elvis","roxette" |
| User 10 | "lullaby","lullabies","baby","rockabye","renditions","lullabys","lullabyes","nursery","bedtime" |
| User 11 | "jpop","japan","japanese","tokyo","jrock","archive" |
| User 12 | "sweden","disney","lion","musicals","90s","broadway","glee","loreen","gleek","gandia", |
| User 13 | "americana","altcountry","southerner","bluegrass","discover","texas","npr","stapleton","archive" |
| User 14 | "kids","countdown","silly","toddler","children","childrens","nursery","playgroup","infants" |
| User 15 | "shabbat","hindi","bollywood","hindustan","arijit","singh","knees" |

*FIGURE 5*

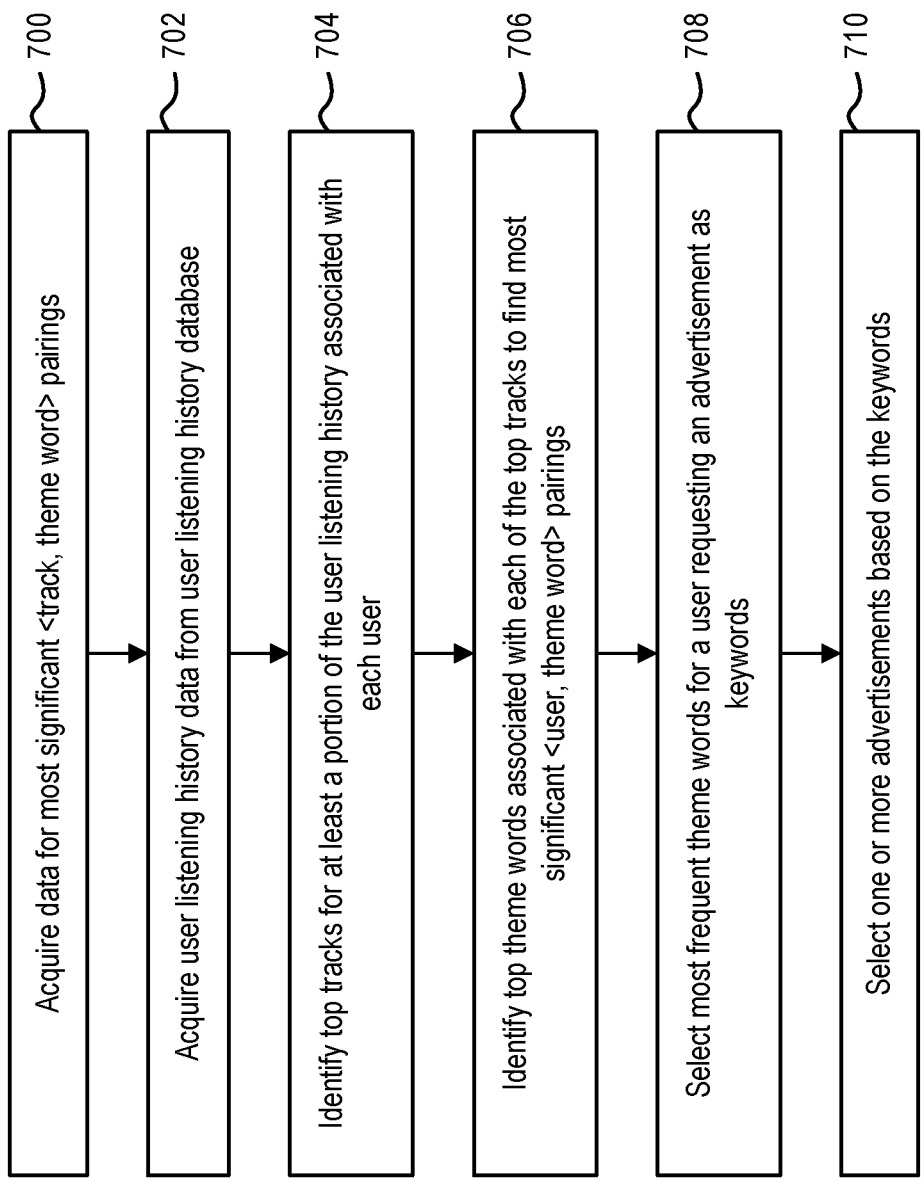

SYSTEM AND METHOD FOR MINING PLAYLIST DATA FOR USE IN PROVIDING DIGITAL MEDIA OR OTHER CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to digital media content environments, and to systems and methods for mining playlist data, for use in providing content, such as, for example, advertisement-supported media content or targeted advertisements.

BACKGROUND

The digital media industry has evolved greatly over the past several years providing consumers the ability to stream media content, such as music, songs, and videos, at any location or time of day, using a wide variety of computing systems, handheld entertainment devices, smartphones, or other types of media devices and platforms.

Some streaming environments provide users with access to media content via a "freemium" service model that provides basic features including media content streaming that is free to users, with advertisements inserted into media streams to generate revenue. With such a model, advertisements are occasionally injected into a media stream or otherwise presented to the user during playback of media content. Such "freemium" streaming services are an example of one type of environment in which embodiments of the invention can be used.

SUMMARY

In accordance with an embodiment, described herein is a system and method for mining playlist data, for use in providing advertisement-supported media content or targeted advertisements. A media server provides media content items as one or more media streams. Each of a plurality of playlists is associated with theme words provided by a title and/or description of the playlist. A playlist can also be associated with one or more theme words associated with the at least one media content item included in the playlist based on inclusion of the at least one media content item in the playlist. A dataset of media content item-theme word pairs provides an association of a particular media content item included in a particular playlist, with a theme word associated with that playlist. A score is assigned to each of the media content item-theme word pairs based on their appearances across several playlists. Advertisement-supported media content or targeted advertisements can be selected based on the dataset of media content item-theme word pairs, and, for example, fetched from an advertisement server, for insertion into a media stream.

BRIEF DESCRIPTION OF THE FIGURES

FIG. 5 illustrates an example dataset for generating keywords, in accordance with an embodiment.

FIG. 7 illustrates a method for delivering media content with targeted advertisements, in accordance with a further embodiment.

DETAILED DESCRIPTION

As described above, today's digital media consumers are able to stream media content, such as music, songs, and videos, at any location or time of day, using a wide variety of computing systems, handheld entertainment devices, smartphones, or other types of media device. Some streaming environments include the ability to provide advertisements to users, for example by occasionally injecting or otherwise displaying advertisements to the users during playback of media content.

Digital Media Content Environments

Figure 1:
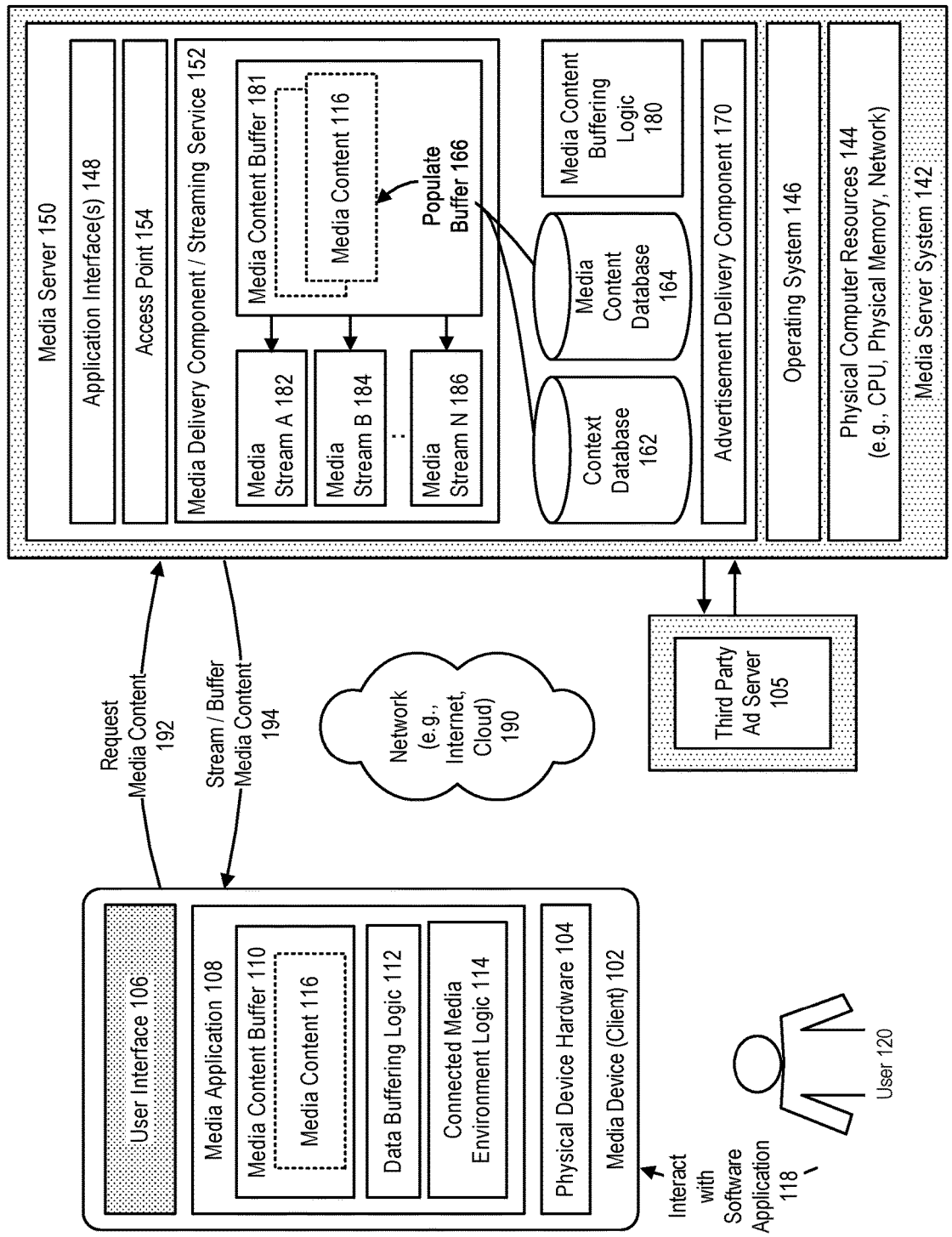
FIG. 1 illustrates an example digital media content environment for streaming media content and targeted advertisements, in accordance with an embodiment.

FIG. 1 illustrates an example digital media content environment for streaming media content and targeted advertisements, in accordance with an embodiment.

As illustrated in FIG. 1, in accordance with an embodiment, a media device 102, operating as a client device, can receive and play media content provided by a media server system 142 or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 114, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate 166 a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 120 can interact 118 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 192 to the media server, via the server's application interface. The media server can populate its server-side media content buffer at the server, with corresponding media content 116, including one or more streams of media content data, and can then communicate 194 the selected media content to the user's media device, or to a controlled device as appropriate, where it can be buffered in a client-side media content buffer for playing at the device.

In accordance with an embodiment, the media server can provide a non-subscription, "freemium" media streaming service, for which a client media device or user can have an associated account and credentials, and which enable the user's media device to communicate with and receive content from the media server with advertisements inserted into a media stream generated by the media server to offset the lack of non-subscription nature of the service. The media server can function as an advertisement server, or alternatively can interact with a separate advertisement server 105, for example as provided as a separate component of the media server system or as provided by a second or third party, accessible to the media server system. As shown, the advertisement server is a third party server, e.g. a Google Ad Words server.

In accordance with an embodiment, an advertisement delivery component 170 of the media server system can be used to request an advertisement from an advertisement server for insertion into a media stream. The advertisement delivery component can select and/or transmit keywords to an advertiser server, for example, and in return receive one or more advertisements based on the keywords from the advertiser server. The advertisement delivery component can interact with the media delivery component to insert the one or more advertisements into the media stream delivered to the user.

In accordance with an embodiment, and as further described below, the system can include a server-side media gateway or access point 154, provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Figure 2:
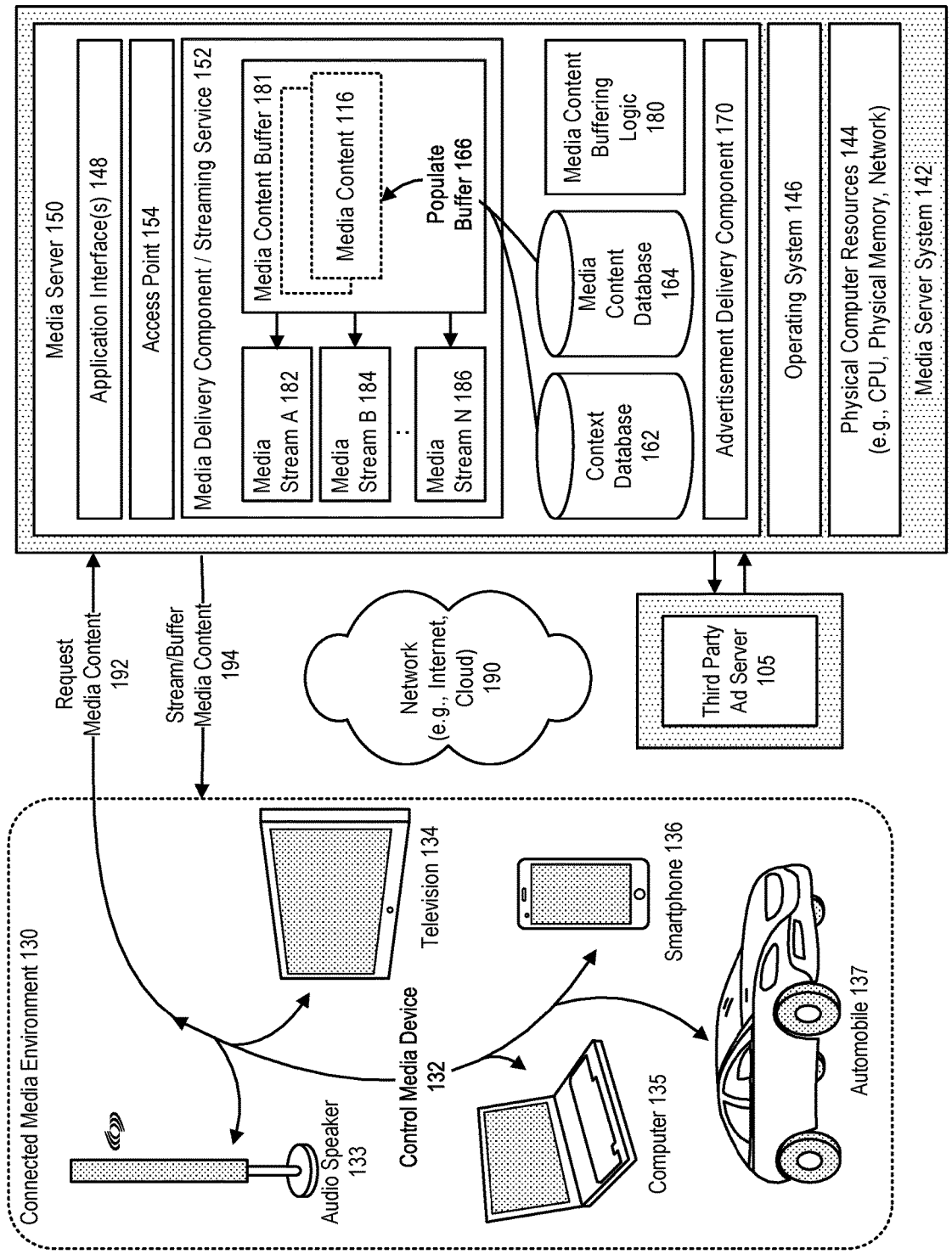
FIG. 2 further illustrates an example of a system for providing media content, in accordance with an embodiment.

FIG. 2 further illustrates an example of a system for providing media content, in accordance with an embodiment.

As illustrated in FIG. 2, in accordance with an embodiment, a connected media environment 130, for example a Spotify Connect environment, enables communication between a client device and the server-side access point in a connected manner from the perspective of a user. Examples of the types of media device that can be provided within a connected media environment include audio speakers 133, televisions 134, computers 135, smartphones 136, and in-car entertainment systems 137, or other types of media device.

In accordance with an embodiment, a client device having an application user interface can act as a controlling client device, to control 132 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 192 to change a media channel, in response to which the media server can switch the media channel at the controlled device, and thereafter continue to stream or buffer media content 194 for the switched channel, at the controlled device.

As described above, in some instances, a portion of the media content can be pre-buffered at the controlled device, so that the switching to the channel at the controlled device operates in a seamless manner.

Mining Playlist Data for Keywords

Some streaming environments provide users with access to media content via a "freemium" service model that provides basic features including media content streaming that is free to users, with advertisements inserted into media streams to generate revenue. With such a model, advertisements are occasionally injected into a media stream or otherwise presented to the user during playback of media content.

Advertisers may wish to have access to information about a listener to determine whether and how to advertise to that listener. For example, an advertiser may like to have access to a profile informing the advertiser of the listener's interests, activities and/or basic biographical details. Listeners may also like to hear advertisements that are relevant to the listener rather than advertisements that are irrelevant or mistargeted to the listener.

However, streaming services may not want to make available profile details of their users to advertisers, for privacy reasons and/or to limit data passing between the service and an advertisement server, for example.

Instead, keywords that are associated with interests, activities and/or biographical details can be made available to advertisers. Advertisers can choose to purchase keywords from which advertisements are selected, for example, by choosing keywords they believe will accurately target the listeners they seek and/or keywords suggested or determined by the service for the advertiser based on information about the listener gleaned from the media content streamed to a user that may fit certain profiles, increasing the probability that the listeners will be accurately targeted by advertisers.

In accordance with an embodiment, described herein is a system and method for mining playlist data to generate keywords for use in providing advertisement-supported media content or targeted advertisements. For purposes of illustration, media content items will be described hereinafter in terms of "tracks". A track can include an individual song or segment of an audio recording. Many streaming services that focus on music deliver media content divided into tracks. However, in other embodiments, the media content items can include video files or audio content other than musical content, for example lectures or other spoken word, and should not be limited to individual songs or instrumental recordings designated as "tracks". Systems and methods for generating keywords for use in requesting and receiving targeted advertisements are likewise applicable to media content items other than tracks.

In accordance with an embodiment, each of a plurality of playlists is associated with theme words derived from a title and/or description of the playlist. A dataset of <track, word> pairs provides an association of a particular track (or other media content item) included in a particular playlist, with a theme word associated with that playlist. A score is assigned to each of the <track, word> pairs based on their appearances across several playlists. Advertisement-supported media content or targeted advertisements can be selected based on the dataset of <track, word> pairs, and, for example, fetched from an advertisement server, for insertion into a media stream.

In accordance with an embodiment, the system is configured to provide targeted advertisements selected based on keywords generated for use by the advertisement delivery component for requesting and receiving one or more advertisements for insertion into a media stream generated by the media delivery component.

In accordance with an embodiment, the keywords can be generated to request and receive advertisements that are targeted to the user based on content and/or tone. For example, if one of the keywords is "Christmas", an advertisement may be retrieved for insertion into a media stream that is related to a product associated with the Christmas holiday, such as tickets to a performance of "A Christmas Carol" at a local theater. Alternatively, an advertisement may be retrieved for insertion into a media stream that is related to an everyday product, but with a Christmas theme, such as an automobile commercial with "Hark! The Heralds Angels Sing" playing as background music.

In accordance with an embodiment, keywords are generated based on the tracks (or other media content items) delivered to the user via the media stream, and theme words derived from one or both of a title and a description of playlists in which the tracks (or other media content items) appear.

As an example, one playlist including eleven musical tracks may be titled "Morning Commute" and include the description "Get going with the best new music!" Multiple theme words can be derived from the title and description of this playlist, including but not limited to "morning", "commute", "new", and "best". Other playlists can include longer titles and/or longer descriptions, and may include theme words in other languages, such as Spanish or French, which may also be used to generate keywords in those languages that may be used to deliver advertisements in those languages.

In accordance with an embodiment, keywords are generated based on scores assigned to a theme word, based on an association with a track (or other media content item) and/or a user, as described in more detail below.

In accordance with an embodiment, the playlists used to generate keywords can include all playlists within the ecosystem of the streaming service, including those playlists created by individual users of the streaming service.

In accordance with an embodiment, the playlists used to generate keywords can include playlists that are filtered based on one or more criteria. Criteria can include, for example, a minimum number of followers of a playlist, a minimum number of total streams of a playlist, a minimum number of shares of a playlist, or a minimum number of downloads of a playlist.

In accordance with an embodiment, the playlists used to generate keywords can include playlists created or curated by users deemed to be reliable based on one or more criteria. Such criteria can include, for example, popularity of playlists curated by the user and/or a degree of confidence assigned to the user by the streaming service.

In accordance with an embodiment, a degree of confidence can also be determined based on one or more criteria, such as, for example, a minimum number of playlists created by a user, a minimum number of streams of playlists created by a user, or a minimum number of followers of playlists created by a user.

In accordance with still other embodiments, the playlists used to generate keywords can be limited to those playlists created by the streaming service, and/or other sources associated with the streaming service, such as playlists curated by individuals on behalf of the streaming service.

In accordance with an embodiment, in addition to being associated with theme words derived from a title and/or description of the playlist, one or more of the playlists can also be associated with theme words inferred from tracks included in the playlist. Associations between tracks and theme words identified based on <track, word> pairs, as described herein, can be used to identify theme words for playlists. For example, if a new, untitled playlist is created and includes Track88, a strong association between Track88 and the word "chill" can be identified, and based on one or more criteria the word can be associated with the new, untitled playlist.

In accordance with an embodiment, one exemplary criterion could identify a word as a theme word associated with the new, untitled playlist when that word is associated with a threshold number of tracks from the total tracks included in the playlist. For example, if the new, untitled playlist includes ten tracks with six of the tracks having been identified as having a strong association with the word "chill", that word "chill" can then be identified as being a theme word associated with that new, untitled playlist. In accordance with an embodiment, theme words derived from tracks can be included for all playlists, no playlists, or playlists that have too few theme words derived from the title and description of the playlist.

Figure 3:
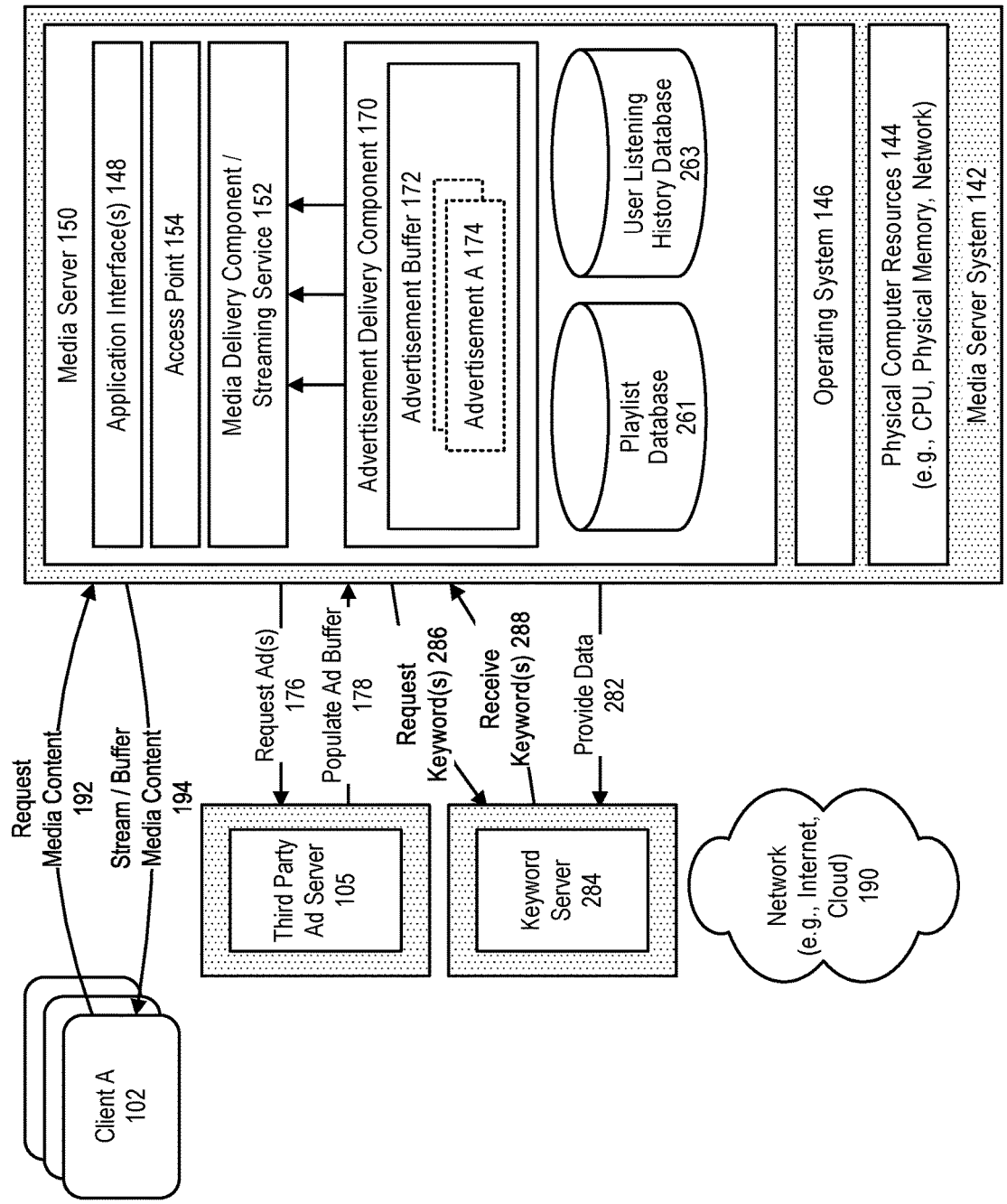
FIG. 3 illustrates a system for streaming media content and for generating keywords for use in requesting and receiving targeted advertisements, in accordance with an embodiment.

FIG. 3 illustrates a system for streaming media content and for generating keywords for use in requesting and receiving targeted advertisements, in accordance with an embodiment.

As illustrated in FIG. 3, in accordance with an embodiment, the advertisement delivery component includes an advertisement buffer 172 for buffering one or more advertisements (e.g., Advertisement A 174) for each client (e.g., Client A) for which the media server is delivering advertisement-based media streams.

In accordance with an embodiment, the advertisement delivery component can request one or more keywords 286 from a keyword server 284, and in return receive one or more keywords 288 generated by the keyword server. The advertisement delivery component uses the keywords generated by the keyword server to request one or more advertisements from an advertisement server.

In accordance with an embodiment, the keyword server can be provided as a component of the media server system, or a second or third-party keyword server. In some embodiments, the keyword server can be provided as a component of the advertisement server, which in turn can be provided as a component of the media server system, or a second or third-party server.

In accordance with an embodiment, the keyword server can be configured to generate keywords based on tracks (or other media content items) delivered to the client via the media stream and theme words derived from playlists in which the tracks (or other media content items) appear. The keyword server can generate keywords in real time by selecting from a list of theme words having pairs with tracks (or other media content items) streamed within a window of time.

In accordance with an embodiment, a <track, word> pair is a scored association of a track (or other media content item) included in one or more playlists with a theme word from the one or more playlists. The keywords can be generated, for example, based on <track, word> pairs for all tracks (or other media content items) delivered over the course of a day, based on <track, word> pairs for tracks (or other media content items) delivered since the last insertion of an advertisement into the media stream, or based on <track, word> pairs for a predefined number of tracks (or other media content items) immediately preceding the request for keywords.

In other embodiments, the keywords can alternatively or additionally be generated by the keyword server in a batch process generating <user, word> pairs based on <track, word> pairs and the user listening profile associated with the particular client (e.g., Client A), as described in further detail below.

In accordance with an embodiment, a <user, word> pair is a scored association of a user with a theme word, based on the track (or other media content item) delivered to the user over a predefined period of time, or alternatively over the lifetime of the user's account.

In accordance with an embodiment, the media server system can provide data 282 to the keyword server for use by the keyword server in building a dataset of <track, word> pairs and a dataset of <user, word> pairs. Scores can be assigned to the <track, word> pairs and to the <user, word> pairs, as further described below. The data provided by the media server system to the keyword server can include, but is not limited to, playlist information including, for example, title, description and track (or other media content item) listings, track (or other media content item) stream counts, and user listening history data. The data can be provided periodically (e.g., daily), or upon instruction by or to the media server system.

In accordance with an embodiment, some of the data can be provided more frequently than others of the data for generating separate datasets. For example, the user listening history data can be provided weekly, while playlist information and track (or other media content item) stream counts can be provided daily.

In accordance with an embodiment, the advertisement delivery component, having received the one or more keywords from the keyword server, provides the one or more keywords to the advertisement server and requests one or more advertisements 176 from the advertisement server. The advertisement server selects the one or more advertisements based on the one or more keywords.

As noted above, in accordance with an embodiment, the advertisement server can be provided as a component of the media server system, or a second or third-party advertisement server, as illustrated. The advertisement server delivers the selected one or more advertisements to the advertisement service, populating the advertisement buffer 178 for the client (e.g., Client A). The advertisement delivery component communicates with the media delivery component to insert the selected one or more advertisements into the media stream for that client.

Building Datasets for Use in Generating Keywords

Figure 4:
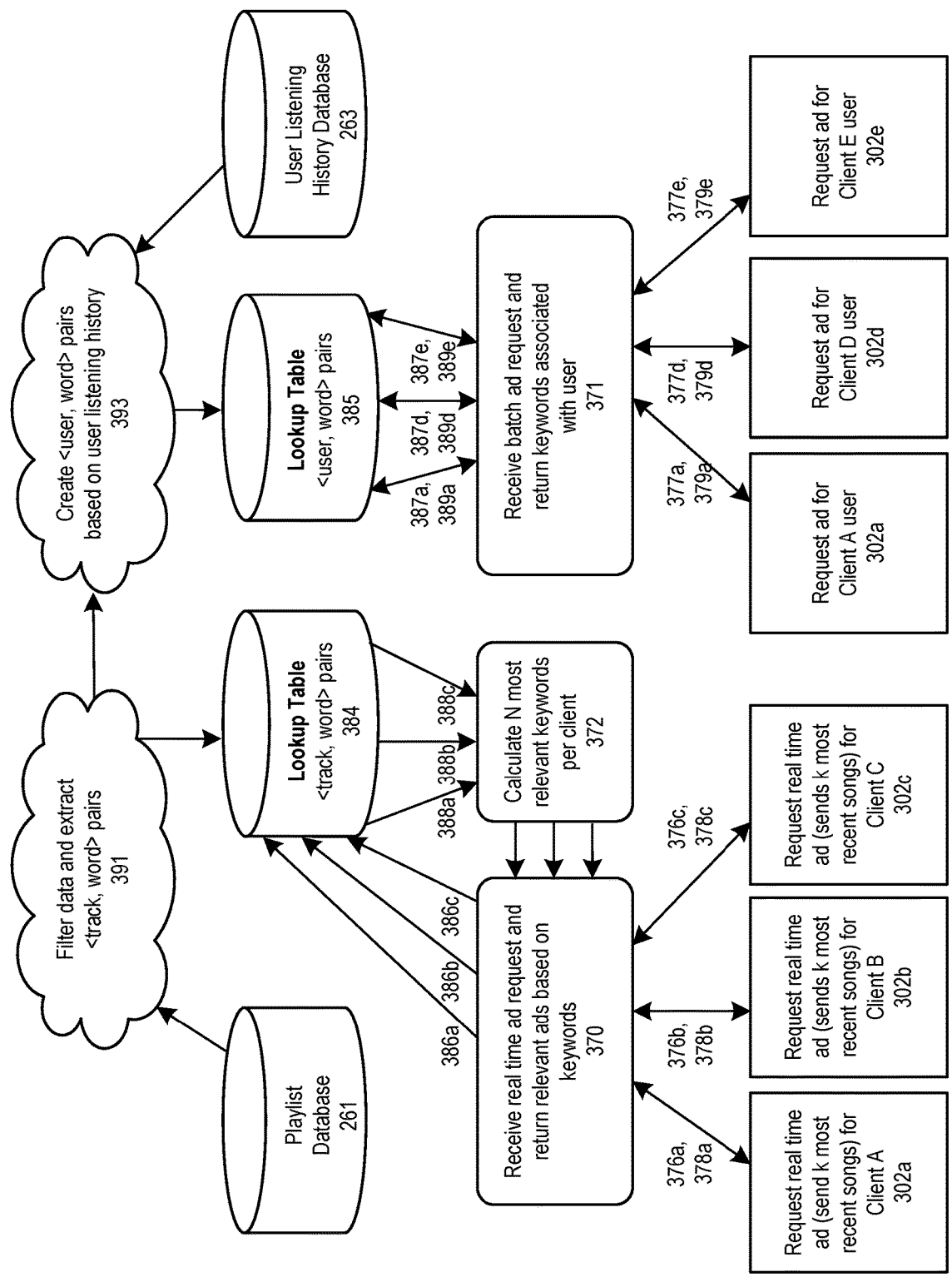
FIG. 4 illustrates a process for generating keywords for use in requesting and receiving targeted advertisements, in accordance with an embodiment.

FIG. 4 illustrates a process for generating keywords for use in requesting and receiving targeted advertisements, in accordance with an embodiment.

As illustrated in FIG. 4, in accordance with an embodiment, the process diagram is intended to distinguish how keywords are generated and retrieved from where components for generating and retrieving keywords are physically located relative to the media server system. For example, some or all of the components described above with regard to FIGS. 1-3 can be located on or otherwise provided by the media server system, or located or otherwise provided remotely from the media server system and/or as a second or third-party component.

As illustrated in FIG. 4, the media content items for the process diagram are "tracks". A track includes an individual song or segment of an audio recording. Many streaming services that focus on music deliver media content divided into tracks. In other embodiments, the media content items can include video files or audio content other than musical content, for example lectures or other spoken word. Systems and methods for generating keywords for use in requesting and receiving targeted advertisements are likewise applicable to media content items other than tracks.

In accordance with an embodiment, the system can build a dataset of <track, word> pairs 391 based on all or a select portion of the playlist data available to the streaming service by periodically generating a list of words extracted from information associated with the playlists including one or both of the titles and the descriptions of playlists retrieved from a playlist database 261, and pairing the list of words for each playlist with each track listed in that playlist. The system aggregates each occurrence of a word in a playlist, each occurrence of a track in a playlist and each occurrence of a <track, word> pair in a playlist. A score is then generated for each of the <track, word> pairs, the score representing the possible significance of an association between the track and the word.

As further described below, some words can be filtered to generate a dataset of those words that have a meaningful association with the tracks. For example, the playlist titled "Morning Commute" and including eleven musical tracks and the description "Get going with the best new music!" includes the words "morning", "commute", "get", "going", "with", "the", "best", "new" and "music". A dataset of <track, word> pairs can be filtered to reduce the dataset to meaningful associations, such as for example the theme words "morning", "commute", "new", and "best", which indicate a time, an event, an era when the track was created or released, and a measure of critical acclaim, respectively. As described below, the words can be filtered before or after scoring, for example as part of bulk processing of the data.

In accordance with an embodiment, the frequency of occurrence of each <track, word> pair depends on the appearance of a track within the population of playlists and the appearance of a word within the information for the portion of the population of playlists in which the track appears. For example, if Track Z88 appears in 250,000 different playlists and the word "running" appears 50,000 times within the information associated with those 250,000 different playlists, the frequency of occurrence for that <track, word> pair for Track Z88 and "running" is 50,000.

In accordance with an embodiment, the score generated for each <track, word> pair can be determined as a function of the frequency of occurrence of the word of the pair (i.e., word count), the frequency of occurrence of the track of the pair (i.e., track count), and the frequency of occurrence of the <track, word> pair itself (i.e., <track, word> pair count), with the frequency of occurrence being counted across all of the playlists from which the data is extracted.

For example, in accordance with an embodiment, the score can be represented as follows:

$$score_{track,word} = f(word_{count}, track_{count}, (track,word)_{count})$$

In accordance with an embodiment, the score can be generated using one or more statistical methods or techniques applied by the system to the aggregated data.

In accordance with an embodiment, the score can be generated using two or more statistical methods or techniques that are weighted and combined to generate the score. The relative weighting of the two or more statistical techniques can be adjusted, as described below.

In accordance with an embodiment, the score can be generated for each <track, word> pair using a combination of a pointwise mutual information (PMI) calculation and a chi-square calculation, although the use of these statistical techniques are provided by way of examples, and are not intended to limit the types of statistical method or techniques that can be used to generate the score.

In accordance with an embodiment, a PMI calculation can be made by a computer of the system, for example, at least partially based on the following calculation $$pmi(word; track) = \log \frac{p(track \mid word)}{p(track)}$$

while a chi-square calculation can be made by a computer of the system, for example, at least partially based on the following calculation $$chi_{square}(word, track) = \frac{(observed - expected)^2}{expected}$$

where $$expected = \frac{track_{total} \cdot word_{total}}{N_{playlists}}$$

with the two resultant calculations being weighted and combined by the computer to generate a score for each <track, word> pair.

In accordance with an embodiment, the weightings of the statistical techniques in the combination comprising the score can be specified by, for example, an advertiser, including that the weightings can be fixed, or the weightings can have an initial but adjustable setting.

For example, in accordance with an embodiment, the PMI and chi-square calculations can be initially weighted 50%-50%, and adjusted based on data related to user response to advertisements selected and inserted into media streams using keywords generated based on the <track, word> pair scores.

In accordance with an embodiment, the number and type of statistical methods or techniques and relative weightings can be varied over time, for example based on advertisement analysis of click-through data related to advertisements selected and inserted into media streams using keywords generated based on the <track, word> pair scores.

In accordance with an embodiment, the number and type of statistical methods or techniques and relative weightings can also be varied based on improved scoring methods developed by the streaming service.

In accordance with an embodiment, natural language processing can be also applied to the word data to modify the counted occurrences of <track, word> pairs and to score the <track, word> pairs to find the most significant <track, word> pairings.

In accordance with an embodiment, the <track, word> pairs and scoring for the <track, word> pairs can be generated periodically and populated to a database accessible to a keyword server or advertisement server.

For example, in accordance with an embodiment, the dataset for the <track, word> pairs is generated and filtered daily by a back-end server and a lookup table 384 for the filtered <track, word> pairs is created via a highly accessible database such as, for example, an Apache Cassandra database. The lookup table associates each track with a number of theme words. A lookup table can be accessed by a keyword server or advertisement server and keyword(s) returned for each track within a few milliseconds, enabling real time or near real time look ups. In accordance with an embodiment, the database can reside on the keyword server. In accordance with an embodiment, the database can be reside separately from the keyword server.

In accordance with an embodiment, words contained within information included with each playlist can be filtered to generate the theme words. Theme words can comprise words that meet certain conditions. For example, one condition can include that the word must occur frequently enough in the data to exclude misspelled words. Another condition can include that the word must have contextual meaning. For example, articles of speech such as "the" and "an" are excluded from theme words. Another condition can include that the word not occur too frequently so that an occurrence of the word lacks practical meaning. For example, words frequently used in naming playlists such as 'music', 'playlist' and 'pop' can be removed from a list of theme words for a playlist. Another condition can include that a score assigned to a <track, word> pair must be sufficiently high so that tracks without a significant association with a word are not assigned to that word as a <track, word> pair.

In accordance with an embodiment, in addition to the above filtering, other processing can be applied to the data. For example, in addition to removing misspelled words and typographical errors, the word spellings can be corrected and the data used to score the corrected word.

In accordance with an embodiment, words from playlists can be translated into different languages so that a universal (or multi-lingual) set of playlist data can be used to generate keywords for selecting advertisements in the native language of the user, while accessing a sufficiently populated dataset for the native language. In accordance with an embodiment, semantic mappings can be created to extract additional, new theme words that preserve the main data characteristics of the original theme words.

In accordance with an embodiment, data can be filtered and scored to generate <track, word> pairs periodically by processing the data, for example via a MapReduce job. Such jobs can be performed on a substantial amount of data in a sufficiently manageable time frame to enable a lookup table to be created, recreated or refreshed frequently, including daily.

Referring again to FIG. 4, when the system receives requests 376a-376c for one or more real time advertisements, for example for Clients A, B and C 302a-302c, the system requests relevant advertisements based on keywords 370.

In accordance with an embodiment, the keywords can be selected based on a predefined number, k, of tracks, for example the list of tracks streamed from the last insertion of an advertisement into the media stream. As described above, the system can access a database including a lookup table to request keywords for use in requesting and selecting one or more advertisements from an advertisement server corresponding to a predefined number of theme words with highest <track, word> pair score for the k tracks that have been streamed. The system, for example via the keyword server, can send the listing of k tracks and request all <track, word> pairs 386a-386c and from the <track, word> pairs returned 388a-388c the system can calculate the N most relevant keyword(s) 372 per client. The one or more advertisements selected based on the keyword(s) for each of the clients is then returned 378a-378c for insertion into the media streams for the respective clients.

In accordance with some embodiments, the keywords returned can comprise a superset that can then be further filtered based on previous submissions to the advertisement server, for example to reduce repetition of advertisements that may distract or annoy the user, or to repeat use of keywords that result in favorable responses from users, such as click-through by the user.

In accordance with an embodiment, the system can build an additional dataset comprising a batch dataset of <user, word> pairs using the filtered dataset for the <track, word> pairs 393 or the unfiltered data used to generated the <track, word> pairs. The batch dataset can be generated using a MapReduce job in the cloud (or via some other processing technique) and generates theme words for each user of the streaming service based on the user's listening history received or obtained from a user listening history database 263.

In accordance with an embodiment, the system can select a set of tracks from the user's listening history, obtain a subset of one or more theme words associated with each track from the set of tracks, and pair those theme words with the user.

In accordance with an embodiment, the user listening history used to generate the dataset can include the entire history of tracks streamed to the user or a subset of tracks, such as those tracks requested and/or specifically selected by the user individually or selected as part of a set, such as via an album. Additionally, the user listening history can span the user's entire time using the service, or can be limited to a predetermined span looking backward in time. For example, the user listening history can be limited to the user listening history preceding the generation of the dataset by up to a month.

In accordance with an embodiment, the tracks identified in the user listening history can be ranked, for example according to the number of occurrences of each track being streamed to the user. Theme words associated with the top ranked tracks can be selected according to multiple different methods. For example, one or more theme words can be selected beginning with the top ranked track and selecting the highest scored theme words paired with that track.

Alternatively, some other method can be used. For example, the tracks can be selected as a set based on a cut-off of a number of tracks based on the highest number of occurrences of the tracks, then the theme words can be selected based on the ranked scores for every <track, word> pair associated with the set of tracks, rather than favoring theme words associated with the highest ranked of all of the tracks. Alternatively, the theme words can be selected based on some other method.

FIG. 5 illustrates an example of a partial batch dataset of <user, word> pairs, in accordance with an embodiment. As can be seen, the dataset includes theme words for fifteen users, but in practice will include theme words for a significantly larger user base (for example, Spotify provides media content to over 140 million users).

As illustrated in the example dataset, the bolded theme words are those theme words that would be selected and returned as keywords upon a request for keywords from the batch dataset.

A request for keywords for User 4 would return "lin-manuel", "Hamilton" and "broadway". Providing these keywords to an advertisement server, for example, could return an advertisement for tickets to a musical performance that is local to the user as determined based on data indicating the user's location (e.g., as identified in the user profile data or indicated by the IP address of the media device accessing the service). Alternatively, an advertisement could be returned that includes a voice over by Lin-Manuel Miranda.

In accordance with an embodiment, similar theme words could result in different advertisements being returned. For example, User 10 and User 14 theme words include an overlap, in that both indicate media content related to children and toddlers. However, the theme words for User 10 indicate media content intended to help children sleep (see "lullaby"), while the theme words for User 14 indicate media content intended to help children learn or play (see "playgroup", "nursery"). Using such a dataset, advertisements can be selected for User 10 that are lower in volume, or that include soothing background music and/or that advertise products related to baby care; whereas advertisements can be selected for User 14 that are playful and/or that advertise products that appeal to children.

As illustrated, User 5 and User 6 do not return keywords from the theme words, as indicated in this figure by the asterisks ("*") associated with these users. In such instances, the theme words may not reach a threshold level of occurrences, or the theme words may be filtered due to their generic nature or their obscurity.

For example, theme words for User 5 such as "discover", "archive" and "weekly" may be considered generic or nondescript; while theme words for User 5 such as "chiptune" and "8 bit" may be considered too obscure. These theme words may be filtered when generating the <track, word> pair dataset from which the <user, word> dataset is further generated. In accordance with an embodiment, the <user, word> dataset is generated from unfiltered data, resulting in theme words included in <user, word> pairs that would not be included in <track, word> pairs.

In accordance with an embodiment, the keywords returned can be limited to a maximum number (e.g., 10 keywords), and optionally can be ranked and provided to an advertisement server indicating descending preference so that selection of advertisements by the advertisement server can take into account the ranking of keywords.

In accordance with an embodiment, the dataset for the <user, word> pairs can be generated by a back-end server periodically, for example daily or weekly, and a lookup table 385 for the <user, word> pairs can be created via a highly accessible database, similar to the database for the <track, word> pair database. The lookup table associates each user with a number of theme words. A lookup table can be accessed by a keyword server or advertisement server and keyword returned for each user within a few milliseconds, enabling real time or near real time look ups. In accordance with an embodiment, the database can reside on the keyword server. In accordance with an embodiment, the database can be separate from the keyword server.

When the system receives requests 377a, 377d, 377e for one or more advertisements based on keyword(s) from the batch dataset of <user, word> pairs, for example for Clients A, D and E 302a, 302d, 302e, the system requests relevant advertisements based on keywords 371. As described above, the keywords can be selected based on the theme words associated with the user associated with each client. As described above, the system accesses a database 387a, 387d, 387e to request keywords for use in requesting and selecting one or more advertisements from an advertisement server corresponding to a predefined number of theme words with highest <user, word> pair score for the user associated with the client for which the request is processed. Once the keyword(s) are received 389a, 389d, 389e, the keyword(s) are sent to the advertisement server and the one or more advertisements selected based on the keyword(s) for each of the clients is then returned 379a, 379d, 379e for insertion into the media streams for the respective clients.

In accordance with some embodiments, as above, the keywords returned can comprise a superset that can then be further filtered based on previous submissions to the advertisement server, for example to reduce repetition of advertisements that may distract or annoy the user, or to repeat use of keywords that result in favorable responses from users, such as click-through by the user.

In accordance with an embodiment, advertisers can be offered keywords via the real time request for advertisements (e.g., keywords generated based on the media content streamed recently streamed to the user and a fast lookup to a <track, word> pair dataset) or via the batch request for advertisements (i.e., keywords generated in batch based on the user listening history and a fast lookup to a <user, word> pair dataset). The different keyword sources can be priced differently. For example, keywords can be sold to advertisers for the real time request based on at a separate, different price schedule from those keywords for the batch request.

Figure 6:
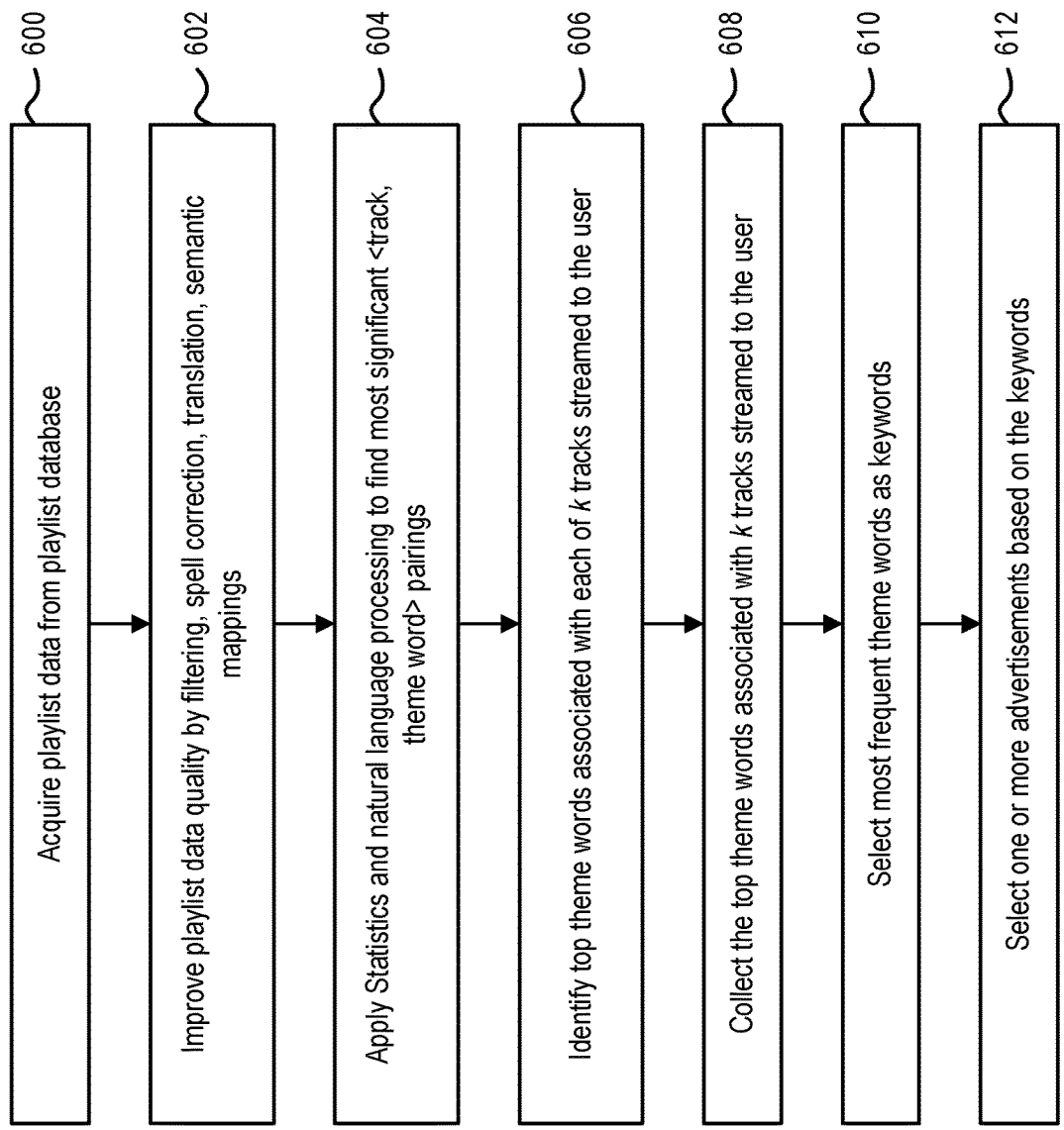
FIG. 6 illustrates a method for delivering media content with targeted advertisements, in accordance with an embodiment.

FIG. 6 illustrates a method for delivering media content with targeted advertisements, in accordance with an embodiment. The method includes selection of one or more advertisements based on a real time advertisement request. The method includes acquiring playlist data from playlist database (Step 600), improving playlist data quality by filtering, spell correction, translation, and semantic mappings (Step 602), and applying statistics and natural language processing to find most significant <track, word> pairings (Step 604). The top theme words associated with each of k tracks streamed to the user are then identified (Step 606) and the top theme words associated with k tracks streamed to the user are collected (Step 608). The most frequent theme words selected as keywords (Step 610) and one or more advertisements are selected based on the keywords (Step 612). The one or more advertisements can then be inserted into a media stream.

FIG. 7 illustrates a method for delivering media content with targeted advertisements, in accordance with a further embodiment. The method includes selection of one or more advertisements based on a batch advertisement request. The method includes acquiring data for most significant <track, word> pairings (Step 700), acquiring user listening history data from a user listening history database (Step 702), and identifying top tracks for at least a portion of the user listening history associated with each user (Step 704). The top theme words associated with each of the top tracks are identified to find most significant <user, word> pairings (Step 706). Based on the <user, word> pair scores, the most frequent theme words for a user requesting an advertisement are selected as keywords (Step 708) and one or more advertisements are selected based on the keywords (Step 710). The one or more advertisements can then be inserted into a media stream.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for delivering media content with targeted advertisements, comprising:
   a media server including an application interface that receives requests from client devices for media content, and a media content buffer that is populated with media content data provided thereon and associated with a plurality of media content items to be communicated to client devices, and a playlist database providing a playlist data describing a plurality of playlists, wherein each playlist includes at least one media content item of the plurality of media content items, and wherein each playlist is associated with one or more theme words;
   wherein one or more of the client devices has a user interface adapted to display media options and to determine a user interaction indicative of selection of a particular media option, and the selection is used as a command to the media server to download, stream, or otherwise access a corresponding particular media content item or a media stream;
   an advertisement server that provides advertisements for insertion into the media stream;

a keyword server that mines the playlist data and generates keywords based on and associated with tracks or other media content items delivered to the client devices and theme words derived from the mined playlist data describing playlists in which the tracks or other media content items appear;

wherein the system is configured to:

communicate, from the media server to the keyword server, the playlist data provided by the playlist database for each of a plurality of playlists, and a user listening history data provided by a user listening history database for each of a plurality of users that includes a history of media content items streamed to the users during a period of time;

generate by, and store, at the keyword server, a dataset of track-word pairs as a first lookup table, based on the playlist data received from the media server, by extracting theme words from titles and descriptions of playlists as indicated by the playlist data, and pairing the theme words for each playlist with media content items within the playlist;

generate by, and store, at the keyword server, a dataset of user-word pairs as a second lookup table, based on the user listening history data received from the media server and by reference to a set of media content items streamed to each particular user as indicated by their user listening history data, and the theme words associated with each media content item within the set as indicated by the dataset of track-word pairs;

wherein the lookup table of track-word pairs associates of a particular media content item included in a playlist with a particular theme word determined from the one or more theme words associated with the playlist, and wherein the lookup table of user-word pairs associates each particular user with a plurality of theme words determined from and associated with one or more media content items delivered to the user during a period of time;

assign a score to each track-word pair by determining a frequency of appearances of the track-word pair across the plurality of playlists associated with the theme words;

assign a score to each user-word pair by determining a frequency of appearances of each theme word associated with the media content items delivered to the particular user over a period of time;

while delivering a media stream to the particular user at a particular client device, evaluate, by the keyword server referencing the lookup table of track-word pairs and the lookup table for the user-word pairs, the score assigned to each track-word pair, and the score assigned to each user-word pair, to determine one or more keywords from the one or more theme words, for use in selecting an advertisement from the plurality of advertisements to be fetched from the advertisement server, based on:

the one or more media content items delivered to the particular user in the media stream preceding the advertisement, and at least one of:

the score assigned to each track-word pair associated with the one or more media content items delivered to the particular user in the media stream preceding the advertisement, or the score assigned to each user-word pair associated with the one or more media content items delivered to the particular user in the media stream preceding the advertisement; and insert the selected advertisement into the media stream.

2. The system of claim 1, wherein the one or more theme words associated with a playlist is derived from one or more of a title of the playlist, a description of the playlist, and one or more theme words associated with at least one media content item included in the playlist.

3. The system of claim 1, wherein the score assigned to each track-word pair is assigned based on a combination of two or more statistical calculations for the track-word pair, and wherein the relative weighting of the combination is adjustable for each advertiser associated with the plurality of advertisements.

4. The system of claim 3, wherein the score assigned to each track-word pair is assigned based on a combination of a pointwise mutual information (PMI) calculation and a chi-square calculation for the track-word pair.

5. The system of claim 1, wherein the system selects the one or more keywords for use in selecting the advertisement based on highest score for track-word pairs associated with a last k media content items streamed to the user.

6. The system of claim 5, wherein the advertisement server includes a real time advertisement server; and wherein the real time advertisement server of the system selects the advertisement by receiving an ad request, querying the first lookup table maintaining the dataset for track-word pairs for the last k media content items streamed to the user, calculating N most relevant theme words for the last k media content items, to be selected as the one or more keywords, and selecting the advertisement based on the N most relevant theme words.

7. The system of claim 1, wherein the system selects the one or more keywords for use in selecting the advertisement based on highest score for track-word pairs associated with the user.

8. The system of claim 7, wherein the advertisement server includes a real time advertisement server and a batch advertisement server;

wherein an advertisement is selected for an advertiser by one of the real time advertisement server and the batch advertiser server;

wherein the real time advertisement server of the system selects the advertisement by receiving an ad request, querying the first lookup table maintaining the dataset for track-word pairs for the last k media content items streamed to the user, calculating N most relevant theme words for the last k media content items, to be selected as the one or more keywords, and selecting the advertisement based on the N most relevant theme words; and wherein the batch advertisement server of the system selects the advertisement by receiving an ad request, querying the second lookup table maintaining the dataset for the user-word pairs for the user, receiving N most relevant theme words for the user, as the one or more keywords, and selecting the advertisement based on the N most relevant theme words.

9. A method for delivering media content with targeted advertisements, comprising:
providing a media server including an application interface that receives requests from client devices for media content, and a media content buffer that is populated with media content data provided thereon and associated with a plurality of media content items to be communicated to client devices, and a playlist database providing a playlist data describing a plurality of playlists, wherein each playlist includes at least one media content item of the plurality of media content items, and wherein each playlist is associated with one or more theme words;
wherein one or more of the client devices has a user interface adapted to display media options and to determine a user interaction indicative of selection of a particular media option, and the selection is used as a command to the media server to download, stream, or otherwise access a corresponding particular media content item or a media stream;
wherein the media server communicates with an advertisement server that provides advertisements for insertion into the media stream, and a keyword server that mines the playlist data and generates keywords based on and associated with tracks or other media content items delivered to the client devices and theme words derived from the mined playlist data describing playlists in which the tracks or other media content items appear;
communicating, from the media server to the keyword server, the playlist data provided by the playlist database for each of a plurality of playlists, and a user listening history data provided by a user listening history database for each of a plurality of users that includes a history of media content items streamed to the users during a period of time;
generating by, and storing, at the keyword server, a dataset of track-word pairs as a first lookup table, based on the playlist data received from the media server, by extracting theme words from titles and descriptions of playlists as indicated by the playlist data, and pairing the theme words for each playlist with media content items within the playlist;
generating by, and storing, at the keyword server, a dataset of user-word pairs as a second lookup table, based on the user listening history data received from the media server and by reference to a set of media content items streamed to each particular user as indicated by their user listening history data, and the theme words associated with each media content item within the set as indicated by the dataset of track-word pairs;
wherein the lookup table of track-word pairs associates a particular media content item included in a playlist with a particular theme word determined from the one or more theme words associated with the playlist, and wherein the lookup table of user-word pairs associates each particular user with a plurality of theme words determined from and associated with one or more media content items delivered to the user during a period of time;
assigning a score to each track-word pair, by determining a frequency of appearances of the track-word pair across the plurality of playlists associated with the theme words;
assigning a score to each user-word pair by determining a frequency of appearances of each theme word associated with the media content items delivered to the particular user over a period of time;
while delivering a media stream to the particular user at a particular client device, evaluating, by the keyword server referencing the lookup table of track-word pairs and the lookup table for the user-word pairs, the score assigned to each track-word pair, and the score assigned to each user-word pair, to determine one or more keywords from the one or more theme words, for use in selecting an advertisement from the plurality of advertisements to be fetched from an advertisement server, based on:
the one or more media content items delivered to the particular user in the media stream preceding the advertisement, and at least one of:
the score assigned to each track-word pair associated with the one or more media content items delivered to the particular user in the media stream preceding the advertisement, or
the score assigned to each user-word pair associated with the one or more media content items delivered to the particular user in the media stream preceding the advertisement; and
inserting the selected advertisement into the media stream.

10. The method of claim 9, further comprising:
deriving the one or more theme words associated with a playlist from one or more of
a title of the playlist,
a description of the playlist, and
one or more theme words associated with at least one media content item included in the playlist.

11. The method of claim 9,
wherein the score assigned to each track-word pair is assigned based on a combination of two or more statistical calculations for the track-word pair, and
wherein the relative weighting of the combination is adjustable for each advertiser associated with the plurality of advertisements.

12. The method of claim 11, wherein the score assigned to each track-word pair is assigned based on a combination of a pointwise mutual information (PMI) calculation and a chi-square calculation for the track-word pair.

13. The method of claim 9, wherein the one or more keywords for use in selecting the advertisement is selected based on highest score for track-word pairs associated with a last k media content items streamed to the user.

14. The method of claim 13,
wherein the advertisement server includes a real time advertisement server; and
wherein the real time advertisement server selects the advertisement by
receiving an ad request,
querying the first lookup table maintaining the dataset for track-word pairs for the last k media content items streamed to the user,
calculating N most relevant theme words for the last k media content items, to be selected as the one or more keywords, and
selecting the advertisement based on the N most relevant theme words.

15. The method of claim 9, further comprising:
wherein the one or more keywords for use in selecting the advertisement is selected based on highest score for track-word pairs associated with the user.

16. The method of claim 15,
wherein the advertisement server includes a real time advertisement server and a batch advertisement server;
wherein an advertisement is selected for an advertiser by one of the real time advertisement server and the batch advertiser server;
wherein the real time advertisement server selects the advertisement by
receiving an ad request,
querying the first lookup table maintaining the dataset for track-word pairs for the last k media content items streamed to the user,
calculating N most relevant theme words for the last k media content items, to be selected as the one or more keywords, and
selecting the advertisement based on the N most relevant theme words; and
wherein the batch advertisement server selects the advertisement by
receiving an ad request,
querying the second lookup table maintaining the dataset for the user-word pairs for the user,
receiving N most relevant theme words for the user, as the one or more keywords, and
selecting the advertisement based on the N most relevant theme words.

17. A non-transitory computer readable storage medium, including instructions stored thereon which when read and executed by one or more computers cause the one or more computers to perform the steps comprising:
providing a media server including an application interface that receives requests from client devices for media content, and a media content buffer that is populated with media content data provided thereon and associated with a plurality of media content items to be communicated to client devices, and a playlist database providing a playlist data describing a plurality of playlists, wherein each playlist includes at least one media content item of the plurality of media content items, and wherein each playlist is associated with one or more theme words;
wherein one or more of the client devices has a user interface adapted to display media options and to determine a user interaction indicative of selection of a particular media option, and the selection is used as a command to the media server to download, stream, or otherwise access a corresponding particular media content item or a media stream;
wherein the media server communicates with an advertisement server that provides advertisements for insertion into the media stream, and a keyword server that mines the playlist data and generates keywords based on and associated with tracks or other media content items delivered to the client devices and theme words derived from the mined playlist data describing playlists in which the tracks or other media content items appear;
communicating, from the media server to the keyword server, the playlist data provided by the playlist database for each of a plurality of playlists, and a user listening history data provided by a user listening history database for each of a plurality of users that includes a history of media content items streamed to the users during a period of time;
generating by, and storing, at the keyword server, a dataset of track-word pairs as a first lookup table, based on the playlist data received from the media server, by extracting theme words from titles and descriptions of playlists as indicated by the playlist data, and pairing the theme words for each playlist with media content items within the playlist;
generating by, and storing, at the keyword server, a dataset of user-word pairs as a second lookup table, based on the user listening history data received from the media server and by reference to a set of media content items streamed to each particular user as indicated by their user listening history data, and the theme words associated with each media content item within the set as indicated by the dataset of track-word pairs;
wherein the lookup table of track-word pairs associates a particular media content item included in a playlist with a particular theme word determined from the one or more theme words associated with the playlist, and wherein the lookup table of user-word pairs associates each particular user with a plurality of theme words determined from and associated with one or more media content items delivered to the user during a period of time;
assigning a score to each track-word pair, by determining a frequency of appearances of the track-word pair across the plurality of playlists associated with the theme words;
assigning a score to each user-word pair by determining a frequency of appearances of each theme word associated with the media content items delivered to the particular user over a period of time;
while delivering a media stream to the particular user at a particular client device, evaluating, by the keyword server referencing the lookup table of track-word pairs and the lookup table for the user-word pairs, the score assigned to each track-word pair, and the score assigned to each user-word pair, to determine one or more keywords from the one or more theme words, for use in selecting an advertisement from the plurality of advertisements to be fetched from an advertisement server, based on:
the one or more media content items delivered to the particular user in the media stream preceding the advertisement, and at least one of:
the score assigned to each track-word pair associated with the one or more media content items delivered to the particular user in the media stream preceding the advertisement, or
the score assigned to each user-word word pair associated with the one or more media content items delivered to the particular user in the media stream preceding the advertisement; and
inserting the selected advertisement into the media stream.

18. The non-transitory computer readable storage medium of claim 17, including instructions stored thereon which when read and executed by one or more computers cause the one or more computers to perform the further steps comprising:
deriving the one or more theme words associated with a playlist from one or more of
a title of the playlist,
a description of the playlist,
one or more theme words associated with at least one media content item included in the playlist.

19. The system of claim 1, wherein the system is further configured to filter the dataset of track-word pairs to generate the dataset of user-word pairs associated with a user.

20. The method of claim 9, further comprising filtering the dataset of track-word pairs to generate the dataset of user-word pairs associated with a user.

\* \* \* \* \*